US008064333B2

(12) United States Patent
Yue et al.

(10) Patent No.: US 8,064,333 B2
(45) Date of Patent: Nov. 22, 2011

(54) SYSTEMS AND METHODS FOR ADAPTIVE HYBRID AUTOMATIC RETRANSMISSION REQUESTS

(75) Inventors: Guosen Yue, Plainsboro, NJ (US); Xiaodong Wang, New York, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 595 days.

(21) Appl. No.: 12/233,102

(22) Filed: Sep. 18, 2008

(65) Prior Publication Data
US 2009/0235140 A1 Sep. 17, 2009

Related U.S. Application Data

(60) Provisional application No. 61/035,544, filed on Mar. 11, 2008.

(51) Int. Cl.
G06F 11/14 (2006.01)
G08C 25/02 (2006.01)
H04B 7/005 (2006.01)

(52) U.S. Cl. ........ 370/216; 370/252; 370/278; 370/329; 714/748

(58) Field of Classification Search .................. None
See application file for complete search history.

(56) References Cited

U.S. PATENT DOCUMENTS

| 6,202,188 | B1* | 3/2001 | Suzuki et al. | 714/758 |
| 7,447,968 | B2* | 11/2008 | Ha et al. | 714/748 |
| 7,889,703 | B2* | 2/2011 | Yang et al. | 370/335 |
| 2006/0007884 | A1* | 1/2006 | Tanaka et al. | 370/328 |
| 2007/0253388 | A1* | 11/2007 | Pietraski | 370/338 |
| 2008/0147370 | A1* | 6/2008 | Sjerling | 703/13 |
| 2009/0319855 | A1* | 12/2009 | Yue et al. | 714/751 |

FOREIGN PATENT DOCUMENTS
EP 1304825 A1 4/2003

OTHER PUBLICATIONS

Soljanin, E. et al., "Hybrid ARQ with Random Transmission Assignments", DIMACS Series in Discrete Mathematics and Theoretical Computer Science, vol. 66, 2004.
Leanderson, C.F. et al., "The Performance of Incremental Redundancy Schemes Based on Convolutional Codes in the Block-Fading Gaussian Collision Channel", IEEE Transactions on Wireless Communications, vol. 3, No. 3, May 2004.
Sesia, S. et al., "Incremental Redundancy Hybrid ARQ Schemes Based on Low-Density Parity-Check Codes", IEEE Transactions on Communications, vol. 52, No. 8, Aug. 2004.

* cited by examiner

*Primary Examiner* — Gregory Sefcheck
(74) *Attorney, Agent, or Firm* — Joseph Kolodka

(57) ABSTRACT

Packet transmission is performed in a wireless adaptive hybrid automatic repeat request transmission system. An optimized assignment rate for a packet is determined based at least in part on a maximal number of transmission attempts and a long term signal to noise ration of the wireless transmission system, an optimized quadrature amplitude modulation set is determined for the packet based at least in part on the maximal number of transmission attempts and the long term signal to noise ration of the wireless transmission system, and information related to the packet is transmitted based at least in part on the determined optimized assignment rate and determined optimized quadrature amplitude modulation set.

12 Claims, 9 Drawing Sheets

SYSTEMS AND METHODS FOR ADAPTIVE HYBRID AUTOMATIC RETRANSMISSION REQUESTS

This application claims the benefit of U.S. Provisional Application No. 61/035,544 filed on Mar. 11, 2008, which is incorporated herein by reference.

BACKGROUND OF THE INVENTION

The present invention relates generally to adaptive incremental redundant (IR) hybrid automatic repeat request (ARQ) schemes and more particularly to improving throughput in wireless transmission systems using adaptive IR hybrid ARQ schemes.

In most wireless communication systems, the channels are time-varying. In order to maintain high throughput and reliability simultaneously over such time-varying channels, the forward error correction (FEC) codes can be employed with the use of automatic repeat-request (ARQ) schemes, such as a hybrid ARQ scheme. With hybrid ARQ, the receiver first uses FEC codes to correct the errors and triggers the retransmission when residual error is detected. A simple hybrid ARQ scheme is type-I hybrid ARQ, in which the receiver discards the previous transmission and performs the detection and decoding over the retransmitted signal only. Although this scheme saves the buffer size by discarding the previously received packet, it is not an efficient method in term of throughput.

Generally, two types of hybrid ARQ schemes are of particular interest in data packet systems—Chase combining and incremental redundancy (IR) hybrid ARQ (e.g., type-II hybrid ARQ). In the Chase combining scheme, the repeated coded sequence is sent to receiver upon the ARQ request. The receiver then combines received multiple copies of coded sequence using maximum ratio combining (MRC) for the detection. In type-II hybrid ARQ, additional parity bits are transmitted at each retransmission. The receiver performs the decoding using all received sequences since they belong to one codeword. With IR hybrid ARQ, the throughput performance is improved with a coding gain in additional to the diversity gain. Both Chase combining and IR hybrid ARQ schemes provide throughput gain over type-I hybrid ARQ with the expense of additional buffers and complexity at the receiver.

To achieve high throughput efficiency, both Chase combining and IR hybrid ARQ schemes have been adopted in practical wireless systems. They have also been included in recently established wireless standards. Hybrid ARQ can be classified as synchronous and asynchronous. In synchronous hybrid ARQ, the retransmissions are restricted to occur at known time instants. In asynchronous hybrid ARQ, the retransmissions may occur at any time. For asynchronous hybrid ARQ, additional signaling of ARQ process number is required.

In terms of transmission attributes, the hybrid ARQ can be further classified as adaptive and non-adaptive. In adaptive hybrid ARQ, the transmitter may change the attributes at each retransmission including the modulation, coding rate, resource block allocation, etc. In non-adaptive hybrid ARQ, the modulation, coding rate, and the allocated resource block for retransmissions is the same as the original transmission.

Present, existing solutions have considered non-adaptive hybrid ARQ. That is, the block length and modulation in each retransmission is assumed to be the same as that in the original transmission. For adaptive hybrid ARQ, the conventional solutions only consider the binary coded system without employing the discrete quadrature amplitude modulation (QAM).

Accordingly, improved systems and methods for improving throughput in adaptive IR hybrid ARQ wireless transmission systems are required.

BRIEF SUMMARY OF THE INVENTION

The present invention generally provides a method of packet transmission in a wireless adaptive hybrid automatic repeat request transmission system. An optimized assignment rate for a packet is determined based at least in part on a maximal number of transmission attempts and a long term signal to noise ration of the wireless transmission system, an optimized quadrature amplitude modulation set is determined for the packet based at least in part on the maximal number of transmission attempts and the long term signal to noise ration of the wireless transmission system, and information related to the packet is transmitted based at least in part on the determined optimized assignment rate and determined optimized quadrature amplitude modulation set.

In one embodiment, an optimized assignment rate and throughput is determined for the modulation set using an iterative process. The iterative process includes determining a modulation candidate from the modulation set, determining a number of randomized candidates, a maximal iteration number, and a step size, and determining an optimal assignment rate and throughput for the modulation set using the iterative process. The iterative process also includes generating a set of candidate assignment rates equal to the determined number of randomized candidates, determining the error rates of the candidate assignment rates, determining the throughput of the candidate assignment rates, determining the optimal assignment rate and throughput, determining if the maximal iteration number has been reached, and if the maximal iteration number has not been reached, repeating iterative process. Then, the determined optimal assignment rate and determined throughput are output.

These and other advantages of the invention will be apparent to those of ordinary skill in the art by reference to the following detailed description and the accompanying drawings.

DETAILED DESCRIPTION

The present invention is generally related to improving throughput in adaptive IR hybrid ARQ wireless transmission systems. Adaptive hybrid automatic retransmission request (ARQ) schemes are designed for reliable high-speed packet transmissions in wireless systems. As used herein, "adaptive" indicates that the rates in different transmission blocks can be different in one hybrid ARQ process. In particular, adaptive incremental redundancy (IR) hybrid ARQ for multiple types of input signals is improved. Specifically, Gaussian inputs and practical turbo coded modulation are discussed below.

The throughput of adaptive IR hybrid ARQ is formed based on the renewal-reward theorem. For Gaussian inputs, the error probability after each transmission is obtained from the outage rate. For turbo coded modulation, the error rate is obtained after each transmission block by applying turbo coding theorem for a randomly punctured turbo code ensemble in bit-interleaved coded modulation (BICM).

The throughput optimization is then formed for seeking the optimized transmission rates that maximize the throughput of the hybrid ARQ. A gradient search method is used to optimize the throughput for the Gaussian coded systems and a genetic algorithm is used to optimize the throughput for turbo coded systems. The improved systems and methods described herein provide higher throughput using IR hybrid ARQ (HARQ) than the conventional non-adaptive IR HARQ and Chase combining.

Throughput is optimized for adaptive IR hybrid ARQ and the optimal transmission rate is obtained for each transmission. For practical discrete quadrature amplitude modulation (QAM) modulations, the optimal length of coded bits and QAM modulation for each block transmission in the IR hybrid ARQ process is obtained by solving the throughput optimization problem. In this say, the throughput may be maximized even if the transmitter only has the knowledge of long term signal-to-noise power ratio (SNR) and the small-scale channel feedback is not available at the transmitter.

Figure 1:
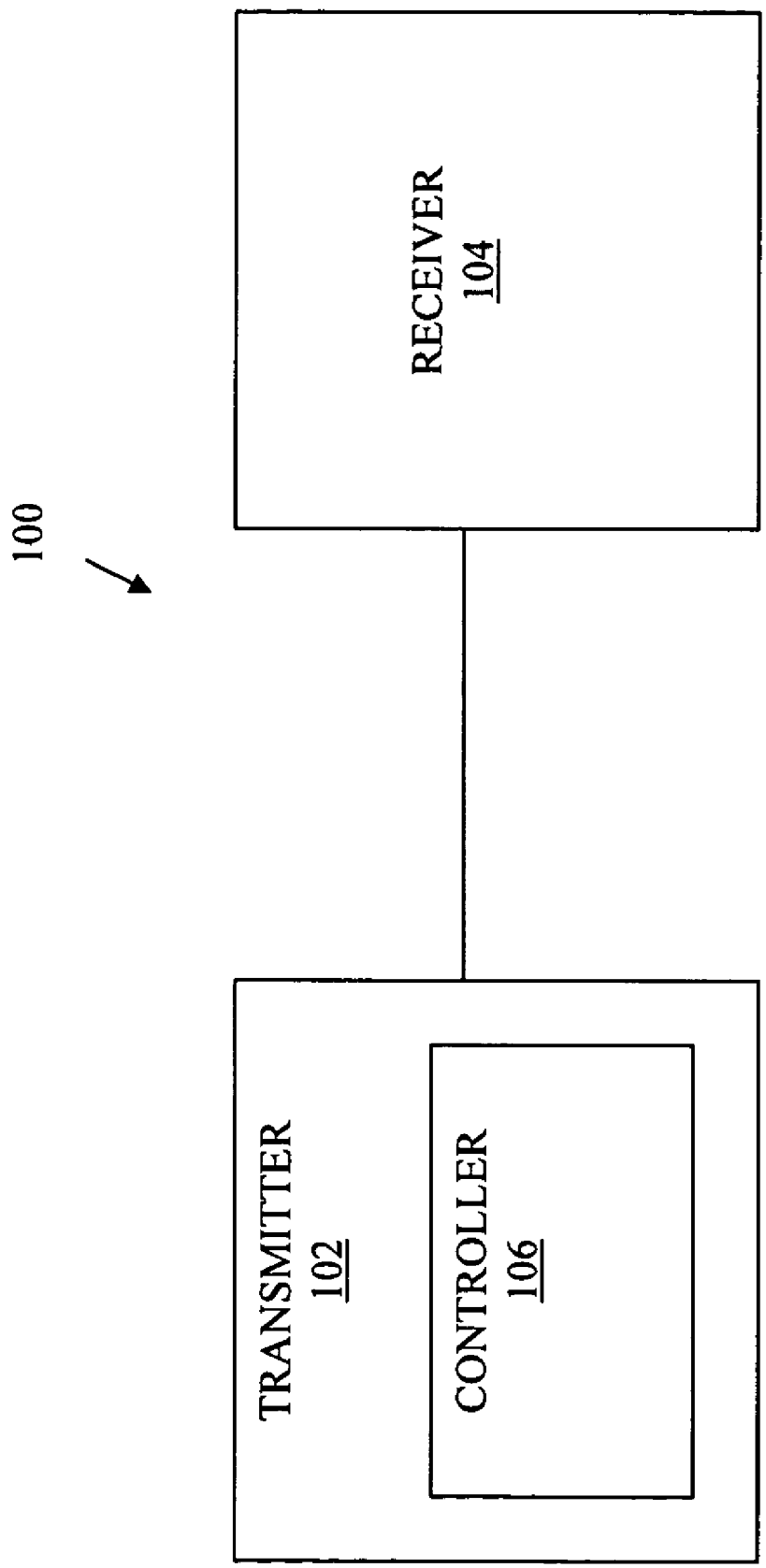
FIG. 1 depicts wireless transmission system according to an embodiment of the present invention

FIG. 1 depicts wireless transmission system 100 according to an embodiment of the present invention. The system 100 comprises a transmitter 102 and one or more receivers 104. Transmitter 102 may be adapted to transmit signals (e.g., wireless communication signals, frames, blocks, symbols, sequences, symbol sequences, etc.) over one or more channels (e.g., parallel logic channels, data channels, etc.). Receiver 104 may be adapted to receive and/or process signals received from the transmitter 102. The system 100 may also a controller 106 which each may be in communication with transmitter 102 and/or receiver 104. Transmission system 100, via transmitter 102 and receiver 104 may also have one or more backward (e.g., feedback) channels to transfer information (e.g., an ACK, a NACK, a retransmission request, etc.) transmitted from the receiver 104 to the transmitter 102 and/or the controller 106.

Transmitter 102 and receiver 104 may be implemented using any appropriate transmitters and receivers adapted to perform the methods described below. One skilled in the art would recognize that system 100 would have other components as well. It is understood that any appropriate combination of these components may be used to implement the invention as described herein. For example, the method steps of method 800 may be employed on, by, or at any combination of controller 106, transmitter 102, the receiver 104, and/or any other device in the system 100.

Transmitter 102, generally, and controller 106, specifically, may include a modulator, encoder, and/or assigner as described below with respect to FIGS. 3-5. That is, transmitter 102 and/or controller 106 may be adapted to assign rates, modulate signals, and/or encode information as discussed below in greater detail—specifically with respect to FIGS. 7-9.

In some embodiments, controller 106 may be or may include any components or devices which are typically used by, or used in connection with, a computer or computer system. Although not explicitly pictured in FIG. 1, the controller 106 may include one or more central processing units, read only memory (ROM) devices and/or random access memory (RAM) devices. The controller 106 may also include input devices such as a keyboard and/or a mouse or other pointing device, and output devices such as a printer or other device via which data and/or information may be obtained, and/or a display device such as a monitor for displaying information to a user or operator. The controller 106 may also include a transmitter and/or a receiver such as a LAN adapter or communications port for facilitating communication with other system components and/or in a network environment, one or more databases for storing any appropriate data and/or information, one or more programs or sets of instructions for executing methods of the present invention, and/or any other computer components or systems, including any peripheral devices.

According to some embodiments of the present invention, instructions of a program (e.g., controller software) may be read into a memory of the controller 106 from another medium, such as from a ROM device to a RAM device or from a LAN adapter to a RAM device. Execution of sequences of the instructions in the program may cause the controller 106 to perform one or more of the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory may store the software for the controller which may be adapted to execute the software program, and thereby operate in accordance with the present invention, and particularly in accordance with the methods described in detail below. However, it would be understood by one of ordinary skill in the art that the invention as described herein can be implemented in many different ways using a wide range of programming techniques as well as general purpose hardware sub-systems or dedicated controllers.

The program may be stored in a compressed, uncompiled and/or encrypted format. The program furthermore may include program elements that may be generally useful, such as an operating system, a database management system and device drivers for allowing the controller to interface with computer peripheral devices and other equipment/components. Appropriate general purpose program elements are known to those skilled in the art, and need not be described in detail herein.

As indicated herein, the controller 106 may assign rates, modulate signals, and/or encode information. As will be understood by those skilled in the art, the schematic illustrations and accompanying descriptions of the structures and relationships presented herein are merely exemplary arrangements. Any number of other arrangements may be employed besides those suggested by the illustrations provided.

Figure 2:
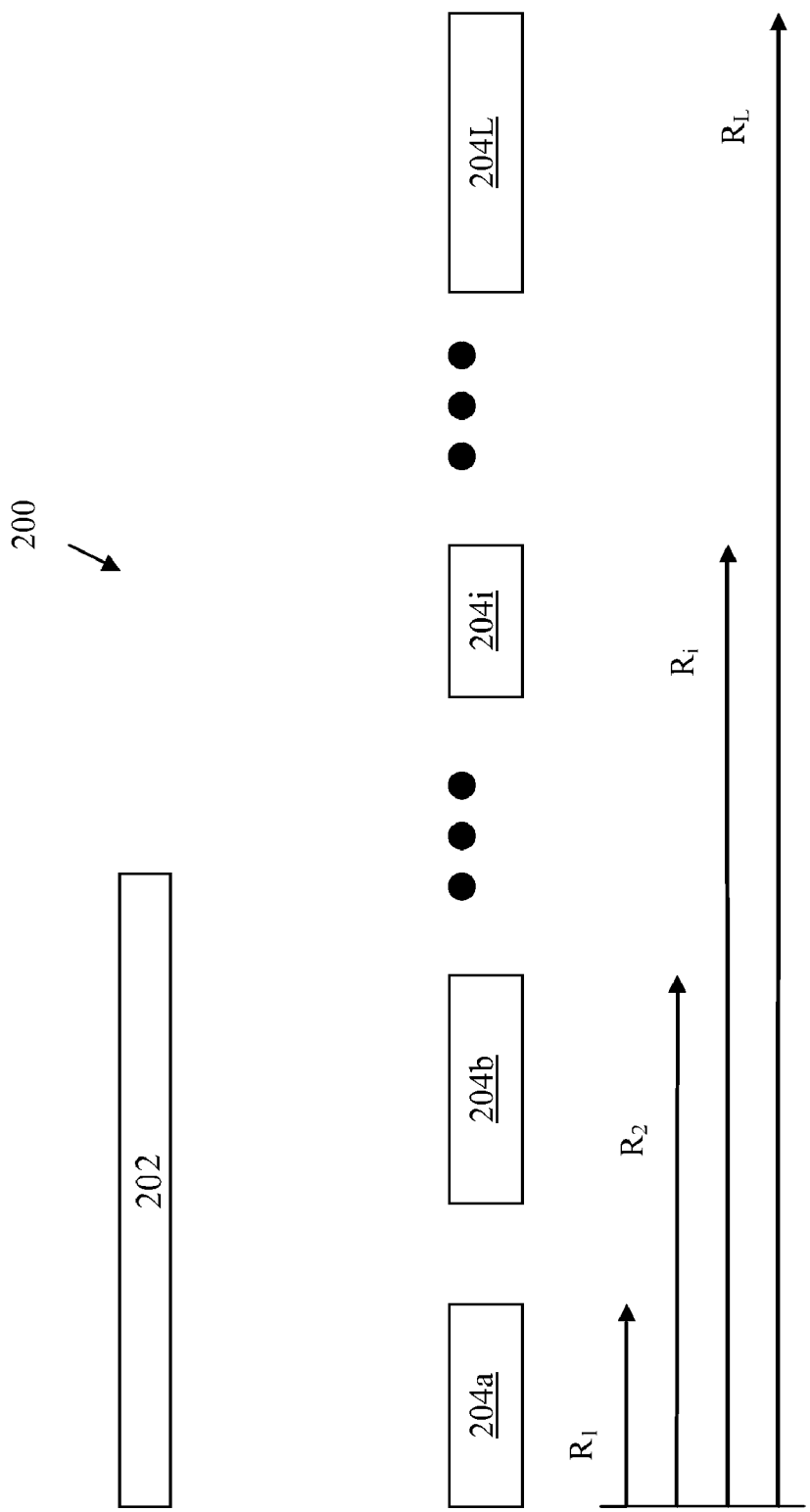
FIG. 2 depicts a general adaptive hybrid ARQ process.

FIG. 2 depicts a general adaptive hybrid ARQ process 200. A length-K information sequence 202 is encoded and transmitted (e.g., by transmitter 102 of FIG. 1) as one or more blocks 204a-204L. A symbol sequence with length $N_1$ is transmitted in the first block 204a at a first rate $R_1$. After a receiver (e.g., receiver 104 of FIG. 1) fails to decode the sequence, a NACK is sent back to the transmitter 102 along with a request for retransmission. The transmitter 102 then sends the coded sequence carrying the original information again with block 204b of length $N_2$ at a second rate $R_2$. Upon request, the transmitter 102 keeps transmitting the coded sequence carrying the original information with block length $N_3, N_4, \ldots$, at rates $R_3, R_4, \ldots$, until the receiver 104 successfully decodes the message and returns an ACK or the maximal number of transmissions L (e.g., block 204L) is reached. The average transmission rate after the $l^{th}$ transmission is then given by $$R_l = \frac{K}{\sum_{i=1}^{l} N_i}.$$

Here, $\epsilon_l$ is the decoding error event and $D_l$ is the successful decoding event after the $l^{th}$ transmission. q(l) is the probability of successfully decoding after the $l^{th}$ transmission and p(l) is the probability of decoding error after the $l^{th}$ transmission. Accordingly, $q(l) \triangleq \Pr(\epsilon_1, \epsilon_2, \ldots, \epsilon_{l-1}, D_l)$ and $p(l) \triangleq \Pr(\epsilon_1, \epsilon_2, \ldots, \epsilon_{l-1}, \epsilon_l)$.

Based on this: $q(l) = p(l-1) - p(l)$.

$\mathcal{R}$ is a random reward—the transmitted information when the HARQ process stops after decoding, for example. Based on the renewal-reward theorem, the throughput of the HARQ is given as $$\eta = \frac{E\{\mathcal{R}\}}{E\{T\}},$$

where T denotes the random transmission time for two consecutive occurrences of the recurrent event (inter-renewal time), e.g. the transmitted block length for each hybrid ARQ process. Given the information block length K and maximal number of transmissions in one hybrid ARQ process L, from the above, the average reward is then given by $$E\{\mathcal{R}\} = \sum_{l=1}^{L} Kq(l) = K(1 - p(L))$$

where $p(0) \equiv 1$.

Similarly, $$E\{T\} = \sum_{l=1}^{L-1} q(l) \sum_{i=1}^{l} N_i + p(L-1) \sum_{i=1}^{L} N_i$$

$$= \sum_{l=1}^{L-1} (p(l-1) - p(l)) \sum_{i=1}^{l} N_i + p(L-1) \sum_{i=1}^{L} N_i.$$

The throughput for HARQ is then given by:

$$\eta = \frac{K(1 - p(L))}{\sum_{l=1}^{L} \left( \sum_{i=1}^{l} N_i \right)(p(l-1) - p(l)) + p(L-1) \sum_{i=1}^{L} N_i}$$

$$= \frac{1 - p(L)}{\sum_{l=1}^{L} \frac{1}{R_l}(p(l-1) - p(l)) + \frac{p(L-1)}{R_L}}$$

This may be simplified by defining the effective rate as $r_l \triangleq K/N_l$, $l = 1, \ldots, L$ giving $$\eta = \frac{K(1 - p(L))}{\sum_{l=1}^{L} N_l p(l-1)}$$

$$= \frac{1 - p(L)}{\sum_{l=1}^{L} \frac{1}{r_l} p(l-1)}$$

$$= \frac{1 - p(L)}{\frac{1}{r_1} + \sum_{l=1}^{L-1} \frac{1}{r_{l+1}} p(l)}.$$

When $N_1 = N_2 = \ldots = N_L$, $r_1 = r_2 = \ldots = r_L = r$ and the HARQ becomes non-adaptive, the throughput for non-adaptive HARQ is given by $$\eta = \frac{r(1 - p(L))}{1 + \sum_{l=1}^{L-1} p(l)}$$

$$= \frac{RL(1 - p(L))}{1 + \sum_{l=1}^{L-1} p(l)}$$

where R is the average rate after L transmissions.

Embodiments where the transmitter 102 has knowledge of long term signal to noise ration (SNR), but not the short term small-scale channel fading are similar to the open-loop HARQ process. In embodiments in which wireless transmission system 100 is a single input single output (SISO) system, a SISO block fading channel is considered.

$x_l \triangleq [x_{l,1}, \ldots, x_{l,N_l}]^T$, $y_l \triangleq [n_{l,1}, \ldots, n_l, N_l]^T$, and $n_l \triangleq [n_{l,1}, \ldots, n_l, N_l]^T$ denote the transmitted signal vector, the receive signal vector, and the background noise vector during the $l^{th}$ transmission, respectively. The transmitted symbol $x_{l,i}$ is from i.i.d. complex Gaussian codebooks with the average signal power per symbol $P = E\{|x_{l,i}|^2\}$. The noise is also i.i.d. complex Gaussian with unit variance $n_{l,i} \sim N_C(0,1)$. The received signal over the $l^{th}$ transmission can be written as $y_l = h_l x_l + n_l$, $l = 1, \ldots, L$, where the complex Gaussian random variable $h_l$, $h_l \sim N_C(0,1)$, is the channel gain during the $l^{th}$ transmission block 204a-104L in a hybrid ARQ process with the power $|h_l|^2 = g_l$. Rayleigh fading and block fading channel model are considered where the channel gain $h_l$ is assumed to remain the same at least during one transmission. Two block fading scenarios may be employed—fast fading and slow fading. For fast fading, it is assumed that the channel gain $h_l$ changes independently from one transmission block 204a-104L to the next transmission block 204a-204L. For slow fading, it is assumed that the channel gain does not change during the entire ARQ process (e.g., $h_l$=h), but changes independently when a new hybrid ARQ process starts.

$I_l$ is the accumulated mutual information from the received signals during l transmissions. Therefore, based on channel coding theorem, for any l, the decoding error is bounded from zero if $I_l<R_l$ after the $l^{th}$ transmission. If $I_l>R_l$, the decoding error vanishes as the block length $$\sum_{i=1}^{l} N_i \to \infty.$$

Here, infinite block length is assumed for each transmission. Therefore, the error event and success event are respectively defined as $\epsilon_l \triangleq \{I_l<R_l\}$ and $D_l \triangleq \{I_l>R_l\}$.

The outage probability over the $l^{th}$ transmission is then $Pr(I_l<R_l)$. The probability p(l) of error decoding with l transmissions is $p(l)=Pr(I_1<R_1, I_2<R_2, \ldots, I_l<R_l)$, and the probability q(l) of successful decoding with l transmissions is $q(l)=Pr(I_1<R_1, I_2>R_2, \ldots, I_l>R_l)$.

The rate constraint is $R_1<R_2<\ldots<R_L$ and the order of average accumulated information $I_l$ is not determined. Evaluation of the error probability p(l) becomes more complex as l increases.

For non-adaptive HARQ, $R_l=R_1/l$, giving the error probability $p(l)=Pr(I_l<R_l, 2I_2<R_l, \ldots, lI_l<R_l)$. The average mutual information $lI_l$ is in a non-decreasing order. Thus, the error probability for non-adaptive hybrid ARQ is $p(l)=Pr(lI_l<R_l)=Pr(I_l<R_l)$.

For adaptive HARQ, $c_l$ is the average mutual information per symbol in the $l^{th}$ transmission only. Thus, $$I_l = \frac{\sum_{i=1}^{l} N_i C_i}{\sum_{i=1}^{l} N_i} = \frac{\sum_{i=1}^{l} \frac{c_i}{r_i}}{\sum_{i=1}^{l} \frac{1}{r_i}} \text{ and } R_l \left(\sum_{i=1}^{l} \frac{1}{r_i}\right)^{-1}.$$

Thus, the error probability for adaptive hybrid ARQ is $$p(l) = Pr\left\{\frac{c_1}{r_1}<1, \ldots, \sum_{i=1}^{l} \frac{c_i}{r_i}<1\right\} \text{ or } p(l) = Pr\left\{\sum_{i=1}^{l} \frac{c_i}{r_i}<1\right\}$$

since $$\sum_{i=1}^{l} \frac{c_i}{r_i}$$

is non-decreasing over l.

For SISO systems in block fading channel, the average mutual information for the $l^{th}$ block only is $c_l=\log(1+g_l P)$. Thus, the error probability for adaptive IR hybrid ARQ is $$p_{A,IR}(l) = Pr\left\{\sum_{i=1}^{l} \frac{1}{r_i} \log(1+g_i P)<1\right\}$$

and the error probability for non-adaptive IR hybrid ARQ is $$p_{NA,IR}(l) = Pr\left\{\sum_{i=1}^{l} \log(1+g_i P)<r\right\}.$$

With the above error probabilities, the throughput for adaptive IR hybrid ARQ is obtained using $$\eta = \frac{1-p(L)}{\frac{1}{r_1} + \sum_{i=1}^{L-1} \frac{1}{r_l+1} p(l)}.$$

Since Rayleigh fading is considered, the power of fading gain $g_l$ satisfies the exponential distribution. The packet error probability for l=1 can then be summarized as $$p_{A,IR}(1) = p_{NA,IR}(1) = p_{CC}(1) = 1 - \exp\left(-\frac{1}{P}(2^{r_1}-1)\right).$$

The SISO system may be extended to multiple input multiple output (MIMO) wireless transmission systems. Such a MIMO system may be used as wireless transmission system 100 of FIG. 1. The MIMO system has $n_T$ transmit antennas and $n_R$ received antennas. In such a system, $y_l(n) \triangleq [y_{l,1}(n), \ldots, y_{l,n_R}(n)]^T$ is the received signal vector, $x_l(n) \triangleq [x_{l,1}(n), \ldots, x_{l,n_T}(n)]^T$ is the transmitted signal vector, and $v_l(n) \triangleq [v_{l,1}(n), \ldots, v_{l,n_R}(n)]^T$ is the noise vector at the $n^{th}$ time slot during the $l^{th}$ transmission, where $n=1, \ldots, N_l$. $H_l$ is an $n_R \times n_T$ matrix with $h_{l,mn}$ being the (m,n)th entry, where $h_{l,mn} \sim N_C(0,1)$. The received signal model for MIMO systems can be described as $y_l(n)=H_l x_l(n)+n(n)$, $n=1, \ldots, N_l$ where the receive power constraint is $E\{\|x_l(n)\|^2\}=P$.

Similar to the SISO case, the error probabilities for adaptive IR hybrid ARQ in MIMO systems can be obtained by $$p(l) = Pr\left\{\frac{c_1}{r_1}<1, \ldots, \sum_{i=1}^{l} \frac{c_i}{r_i}<1\right\}$$

with the $c_l$ being the instantaneous mutual information of the $l^{th}$ MIMO block fading channel, given by $$c_l = \log\det\left(I + \frac{P}{n_T} H_l^* H_l\right).$$

Similar to the SISO system, the average accumulated information $$\sum_{i=0}^{l} \frac{c_i}{i}$$

for MIMO systems is also non-decreasing. The packet error probabilities for MIMO adaptive IR hybrid ARQ are obtained with $$p_{A,IR}(l) = Pr\left(\sum_{i=1}^{l} \frac{1}{r_i} \text{logdet}\left(I + \frac{P}{n_T} H_i^* H_i\right) < 1\right), l = 1, 2, \ldots, L.$$

For non-adaptive IR hybrid ARQ, the retransmission rate is the same as that of the original transmission. The packet error probability after the $l^{th}$ transmission is then given by $$p_{NA,IR}(l) = Pr\left(\sum_{i=1}^{l} \text{logdet}\left(I + \frac{P}{n_T} H_i^* H_i\right) < r\right).$$

With the throughput expressions and the block error rates for different hybrid ARQ schemes described above, the overall average throughput of the hybrid ARQ process may be maximized by optimizing the rate allocation in each transmission. The throughput optimization of adaptive IR hybrid ARQ with Gaussian inputs can be summarized as $$\max_{\{r_l\}} \eta(\{r_l, p_{A,IR}(l)\}_{l=1}^{L}),$$

where the throughput is obtained as described above.

It is seen that above optimization problems are nonlinear and involve the integrations (e.g., for obtaining p(l)), and thus cannot be solved explicitly. Numerical methods are used instead. Here gradient descent search algorithms are used. For adaptive IR hybrid ARQ, define $r = [r_1, \ldots, r_L]^T$. The optimal rate allocations r can be computed iteratively by $r_{(n)} = r_{(n-1)} + \mu_n \nabla r \eta$, where $$\nabla r \eta = \left[\frac{\partial \eta}{\partial r_1}, \ldots, \frac{\partial \eta}{\partial r_L}\right]^T$$

and $\mu_n$ is important to have better performance and faster convergence.

In SISO systems, the optimal rate for maximum average throughput without hybrid ARQ process can be obtained by $$r^* = \underset{r}{\text{argmax}}\, r(1 - e^{-(2^r - 1)/P}).$$

In at least one embodiment, wireless transmission system 100 is a turbo coded single-antenna transceiver system signaling through independent block fading channels. A block of K information bits are first encoded by a rate $r_0 = K/n$ turbo code. Based on the rate allocation, the coded bits are interleaved and randomly punctured to $n_1$ coded bits. The punctured codeword is then modulated using a quadrature amplitude modulation (QAM) constellation into a block of $n_1/M_1$ symbols, where $2^{M_1}$ is the constellation size. The received signal model can also be written as $y_l \triangleq [y_{l,1}, \ldots, y_{l,N_l}]^T$. If decoding is failed at the receiver 104, upon the ARQ request, the rest of the interleaved coded bits that are not transmitted at the first transmission are then punctured to $n_2$ coded bits and modulated to $n_2/M_2$ QAM symbols according to rate assignment for the second transmission. Upon the ARQ request, the transmitter 102 sends $n_l$ of the rest of the coded bits using $M_l$ QAM modulation for the $l^{th}$ transmission. The maximal number of retransmissions is L.

Figure 3:
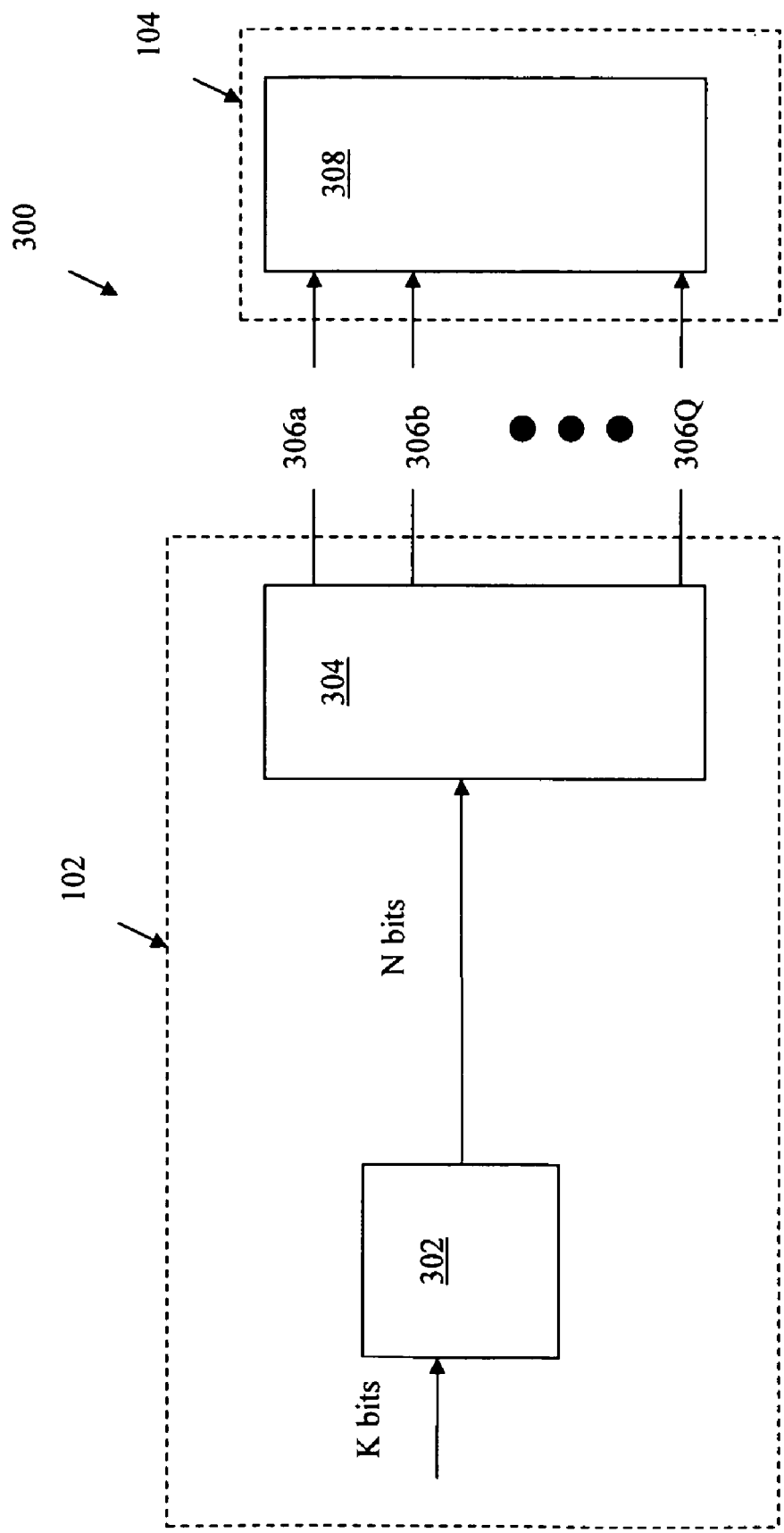
FIG. 3 depicts a system model for parallel channel coding for randomly punctured turbo code according to an embodiment of the present invention.

FIG. 3 depicts a system model 300 for parallel channel coding for randomly punctured turbo code. System model 300 is further elucidation of wireless transmission system 100 according to an embodiment of the present invention. Transmitter 102 includes a turbo encoder 302 and a rate assigner 304. Transmitter 102 transmits over a plurality of parallel channels 306a, 306b, . . . , 306Q. Receiver 104 receives information over parallel channels 306a-306Q and employs turbo decoder 308.

Randomly punctured turbo code for binary IR hybrid ARQ can be viewed as randomly assign different coded bits to Q independent discrete parallel channels with probability $\alpha_q$, $q = 1, \ldots, Q$. The probability $\alpha_q$ is also referred to as the assignment rate for channel q. Therefore, the code rate for the $q^{th}$ channel is $r_q = R/\alpha_q$. The coding theorem is characterized by the Bhattacharyya noise parameter $\gamma_q$ and the mother turbo code ensemble threshold $c^{[C]}_0$. The Bhattacharyya noise parameter $\gamma_q$ for the $q^{th}$ channel is defined as $\gamma_q \triangleq \int \sqrt{p_q(y|0) p_q(y|1)} dy$, where $p_q(y|b)$, $b = \pm 1$, denotes the channel transition probabilities with binary input b. The real value $\gamma_q \in [0,1]$ characterizes the "noisiness" of a binary-input channel. For the extreme value, $\gamma_q = 1$, the channel is so noisy that no communication is asymptotically successful.

The threshold $c_0^{[C]}$ for a turbo code ensemble [C] is defined as $$c_0^{[C]} \triangleq \limsup_{N \to \infty} \max_{D_N < h \leq N} \frac{\ln \overline{A}_h^{[C](N)}}{h} \text{ where } \overline{A}_h^{[C](N)}$$

is the average weight enumerator (AWE). That is, the average number of codewords with weight h and $D_N$ is a sequence of numbers such that $$D_N \to \infty \text{ and } \frac{D_N}{N^\epsilon} \to 0 \,\forall_\epsilon > 0.$$

The turbo code is asymptotically good—the decoding error vanishes when $$N \to \infty \text{ and } \lim_{N \to \infty} \sum_{h=1}^{D_N} \overline{A}_h^{[C](N)} = 0.$$

Therefore, the coding theorem for turbo code ensemble in single channel states if the Bhattacharyya noise parameter $\gamma$ satisfies $\gamma \leq (-c_0^{[C]})$, the turbo code ensemble is asymptotically good.

For binary IR hybrid ARQ, the signals transmitted over different blocks in one hybrid ARQ process are orthogonal. Therefore, each transmission can be treated as sending through one of independent parallel channels. The code theorem for turbo code ensemble is then extended to randomly punctured turbo code ensemble transmitting through parallel channels which is summarized as follows.

For a code ensemble [C] transmitted by transmitter 102 through parallel channels 306a, 306b, ..., 306Q with the assignment rates $\{\alpha_q\}$, the average ML decoding word error probability $$\lim_{N \to \infty} \overline{P}_W^{[C](N)} = 0 \text{ if } \sum_{q=1}^{Q} \alpha_q \gamma_q < \exp(-c_0^{[C]}),$$

where $\gamma_q$ is the Bhattacharyya noise parameter defined above.

Figure 4:
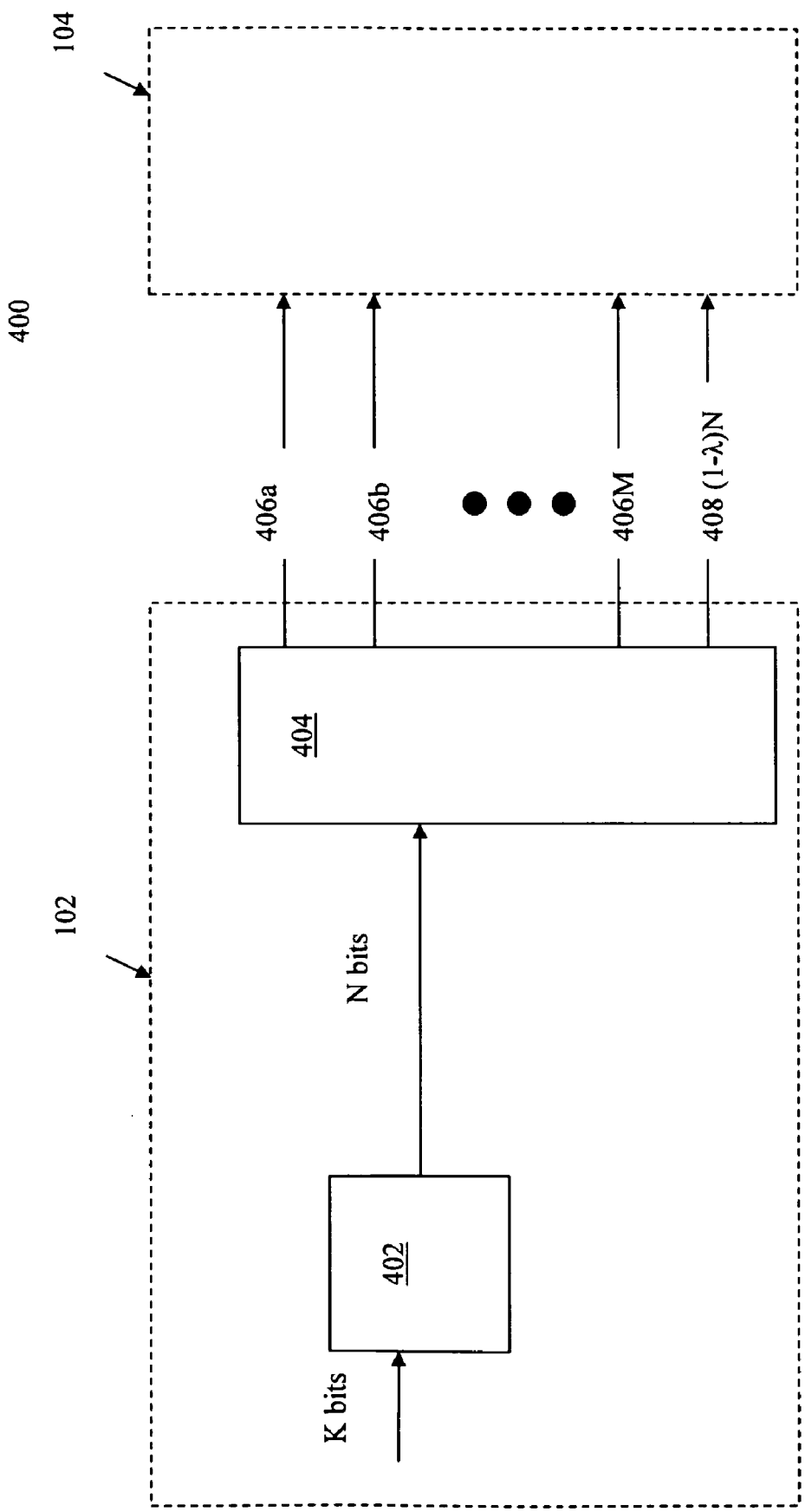
FIG. 4 depicts a parallel channel model for bit-interleaved coded modulation with random puncturing according to an embodiment of the present invention.

Similar to bit-interleaved coded modulation (BICM), an equivalent model with random assignment and random puncturing is used for turbo BICM, as shown in FIG. 4.

FIG. 4 depicts a system model 400 for parallel channel coding for bit-interleaved coded modulation with random puncturing. System model 400 is further elucidation of wireless transmission system 100 according to an embodiment of the present invention. Transmitter 102 includes a turbo encoder 402 and a rate assigner 404. Transmitter 102 transmits λN bits over a plurality of parallel channels 406a-406M. Receiver 104 receives information over parallel channels 406a-406M (e.g., 2m parallel channels mapping to modulation $2^{2m}$). Virtual channel 408 (e.g., with (1−λ)N bits) is a punctured channel.

The transmitted BICM part is modeled by 2m binary-input randomly assigned parallel channels 406a-406M with probability λ. Considering the orthogonal two-dimensional QAM modulation, each dimension is an independent PAM modulation. Therefore, only the one-dimensional PAM case is considered. Hence, m=(½) log$_2$M. As such, m parallel channels 406a-406M can be considered instead of 2m parallel channels. Each channel is for transmitting a particular binary bit in the PAM modulation signal set S (e.g., the $q^{th}$ channel is for the $q^{th}$ bit in the m-bit set for the PAM modulation). For each channel, the assignment rate used by rate assigner 404 is then $\alpha_q$=λ/m and the Bhattacharyya noise parameter is $\gamma_q$. The punctured coded bits that are not transmitted are treated as transmitted through the $(m+1)^{th}$ channel with the Bhattacharyya noise parameter $\gamma_{m+1}$=1.

S is the PAM signal set and $S^q_b$ is the subset of S for all symbols with the bit b in the $q^{th}$ channel. Assuming that all M symbols in the QAM modulation are equally probable, the probability of a symbol $$x \in S^q_b \text{ is } \frac{1}{2^{m-1}}.$$

The transition probability p(y|x) for the $q^{th}$ bit in a PAM modulation is $$p_q(y \mid b) = \frac{1}{2^{m-1}} \sum_{x \in S^q_b} p(y \mid x), q = 1, \ldots, m.$$

The Bhattacharyya noise parameter for the $q^{th}$ channel in an m-bit PAM modulation is then $$\gamma_q = \int \sqrt{\frac{1}{2^{m-1}} \sum_{x \in S^q_0} p(y \mid x) \frac{1}{2^{m-1}} \sum_{x \in S^q_1} p(y \mid z)} dy, q = 1, \ldots, m.$$

For BICM, each binary-input component channel can also be characterized by the conditional mutual information $$\tilde{I} = 1 - E_{b,y}\left[\log \frac{\sum_{x \in S} p(y \mid x)}{\sum_{x \in S^q_b} p(y \mid x)}\right].$$

For the $(m+1)^{th}$ component channel for the punctured coded bits, $\tilde{I}_{m+1}$=0

For a punctured turbo code ensemble [C] of rate $r_0$ transmitted using a m-bit PAM modulation with puncture rate 1−λ. The puncture the average ML decoding word error probability $$\lim_{N \to \infty} \overline{P}_W^{[C](N)} = 0 \text{ if } \sum_{q=1}^{m+1} \alpha_q \gamma_q < \exp(-c_0^{[c]}) \text{ and } \sum_{q=1}^{m+1} \alpha_q \tilde{I}_q \geq r_0 + \xi^{[c]},$$

where $\alpha_q$=λ/m, q=1, ..., m, $\alpha_{m+1}$=1−λ.

$\xi^{[C]}$ is a function of average weight spectrum over the code ensemble [C] and the lower limit of rate difference (or rate loss) between binary random code ensemble and turbo code ensemble. The outage even occurs when either of $$\sum_{q=1}^{m+1} \alpha_q \gamma_q < \exp(-c_0^{[c]}) \text{ and } \sum_{q=1}^{m+1} \alpha_q \tilde{I}_q \geq r_0 + \xi^{[c]}$$

is not satisfied.

Figure 5:
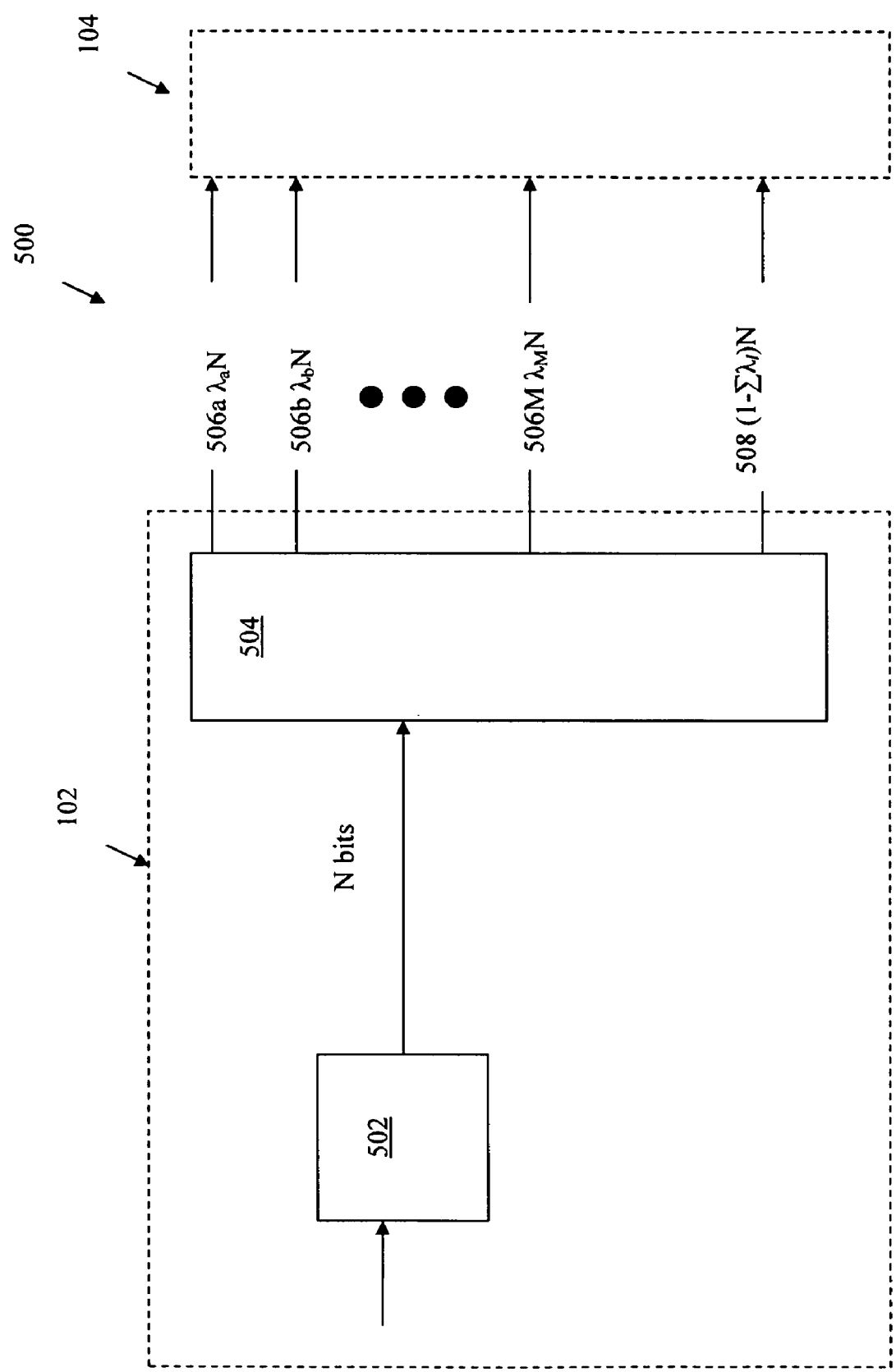
FIG. 5 depicts a system model for equivalent parallel channel coding for adaptive IR hybrid ARQ in turbo bit-interleaved coded modulation with random puncturing according to an embodiment of the present invention.

FIG. 5 depicts a system model 500 for equivalent parallel channel coding for adaptive IR hybrid ARQ in turbo bit-interleaved coded modulation with random puncturing according to an embodiment of the present invention. System model 500 is further elucidation of wireless transmission system 100 according to an embodiment of the present invention. Transmitter 102 includes a turbo encoder 502 and a rate assigner 504. Transmitter 102 transmits over a plurality of parallel channels 506a-506M. Receiver 104 receives information over parallel channels 506a-506M. Virtual channel 508 (e.g., with (1−Σλ$_l$)N bits) is a punctured channel.

As such, system model 500 shows a turbo coded system with adaptive hybrid ARQ for maximal L transmissions. In the $l^{th}$ transmission, Ml-QAM modulation is employed with $2_{ml}$ bits per symbol. Similar to turbo coded BICM, FIG. 5 shows L transmissions using a punctured turbo code modeled as transmitted through L+1 parallel channel sets. Each of L transmissions in a hybrid ARQ is modeled by one parallel channel set with $2_{ml}$, l=1, ..., L channels. The $(L+1)^{th}$ channel set contain only one channel which is for the rest punctured bits that are not transmitted yet.

For a binary random code of rate $r_0$=K/n transmitted through l orthogonal blocks with $\lambda_i$n bits in the $i^{th}$ block employing the modulation from the set $S_i$ of $M_i$ symbols with $2m_i$ bits per symbol, i=1, ..., l. The average ML decoding word error probability goes to zero if $$r_0 \leq \sum_{i=1}^{l} \left( \lambda_i - \frac{\lambda_i}{m_i} \sum_{q=1}^{m_i} E_{b,y} \left[ \log_2 \frac{\sum_{x \in S_i} p_{g_i}(y|x)}{\sum_{x \in S_{i,b}^q} p_{g_i}(y|x)} \right] \right).$$

For a turbo code ensemble [C] of mother rate $r_0$ transmitted through l orthogonal blocks with $\lambda_i$n bits in the $i^{th}$ block and employing a modulation set $S_i$ with $M_i$ symbols and $m_i=(\frac{1}{2})\log_2(M_i)$, i=1, ..., l. The average ML decoding word error probability of the turbo coded IR hybrid ARQ goes to zero if $$\underbrace{\left(1 - \sum_i \lambda_i\right) + \sum_{i=1}^{l} \frac{\lambda_i}{m_i} \sum_{q=1}^{m_i} \lambda_{q,i}}_{\gamma_{H,l}} < \exp(-c_0^{[C]})$$

and $$\underbrace{\sum_{i=1}^{l} \left( \lambda_i - \frac{\lambda_i}{m_i} \sum_{q=1}^{m_i} E_{b,y} \left[ \log_2 \frac{\sum_{x \in S_i p_{g_i}(y|x)}}{\sum_{x \in S_{i,b}^q p_{g_i}(y|x)}} \right] \right)}_{T_l} \geq r_0 + \zeta[C],$$

where $$\gamma_{q,i} = \int \sqrt{\frac{1}{2^{m-1}} \sum_{x \in S_{i,0}^q} p(y|x) \frac{1}{2^{m-1}} \sum_{x \in S_{i,1}^q} p(y|x)} \, dy.$$

Using the above, throughput of wireless transmission system 100 may be optimized (e.g., by employing the methods described below with respect to FIGS. 7-9, etc.) Given the effective rate for the $l^{th}$ transmission $$r_l = r_0 \left(\frac{\lambda_l}{2m_l}\right)^{-1},$$

the throughput of adaptive IR hybrid ARQ with L transmissions in turbo coded systems can obtained by $$\eta_{TC} = \frac{(1-p(L))r_0}{\frac{\lambda_1}{2m_1} + \sum_{l=1}^{L-1} \frac{\lambda_{l+1}}{2m_{l+1}} p(l)}.$$

The block error probability p(l) for adaptive IR hybrid ARQ is $P_{TC,AIR}(l)=Pr(\bar{\gamma}_{H,l}>\exp(-c_0^{|C|}), T_l<r_0+\zeta^{|C|})$. Since for almost all the error events, both inequalities above are satisfied, $$P_{TC,AIR}(l) \approx Pr(\bar{\gamma}_{H,l} > \exp(-c^{|C|0})) =$$

$$Pr\left(\left(1 - \sum_{i=1}^{l} \lambda_i\right) + \sum_{i=1}^{l} \frac{\lambda_i}{m_i} \sum_{q=1}^{m_i} \gamma_{q,i} > \exp(-c_0^{|C|})\right)$$

where $$\gamma_{q,i} = \int \sqrt{\frac{1}{2^{m-1}} \sum_{x \in S_{i,0}^q} p(y|x) \frac{1}{2^{m-1}} \sum_{x \in S_{i,1}^q} p(y|x)} \, dy$$

is used to find $\gamma_{q,i}$. An analytical result cannot be obtained for $\gamma_{q,i}$ so numerical integration is used to find $P_{TC,AIR}(l)$ and $\gamma_{q,i}$. To simplify the integration, the upper bound of $\gamma_{q,i}$ is applied to compute $P_{TC,AIR}(l)$ efficiently. For $$\gamma_{q,i} = \int \sqrt{\frac{1}{2^{m_i-1}} \sum_{x \in S_{i,0}^q} p(y|x) \frac{1}{2^{m_1-1}} \sum_{x \in S_{i,1}^q} p(y|z)} \, dy$$

example, $$\leq \frac{1}{2^{m_i}} \sum_{x \in S_{i,0}^q} \sum_{z \in S_{i,1}^q} \int \sqrt{p(y|x)p(y|z)} \, dy$$

where $d^2(x,z)$ denotes the $$= \frac{1}{2^{m_i-1}} \sum_{x \in S_{i,0}^q} \sum_{z \in S_{i,1}^q} \exp\left(-\frac{d^2(x,z)}{4N_0}\right)$$

Euclidean distance between symbols x and z in a certain constellation. The average of $\gamma_{q,i}$ is $$\bar{\gamma}_i = \frac{1}{m_i} \sum_{q=1}^{m_i} \gamma_{q,i}$$

$$= \frac{1}{m_i 2^{m_i-1}} \sum_{q=1}^{m_i} \sum_{x \in S_{i,0}^q} \sum_{z \in S_{i,1}^q} \exp\left(\frac{d^2(x,z)}{4N_0}\right)$$

where $(d_{min}^{(i)})^2$ is the minimum $$= \frac{1}{m_i 2^{m_i-1}} \sum_n A_n^{(i)} \exp\left(-\frac{(nd_{min}^{(i)})^2}{4N_0}\right)$$

Euclidean distance between two symbols in the constellation set $S^i$ and $A_n^{(i)}$ is the number of the symbol pairs with distance $(nd_{min}^{(i)})^2$. Thus, $$(d_{min}^{(i)})^2 = \frac{6}{2^{2m_i-1}} \exp\left(-\frac{(d_{min}^{(i)})^2}{4N_0}\right).$$

Figure 6:
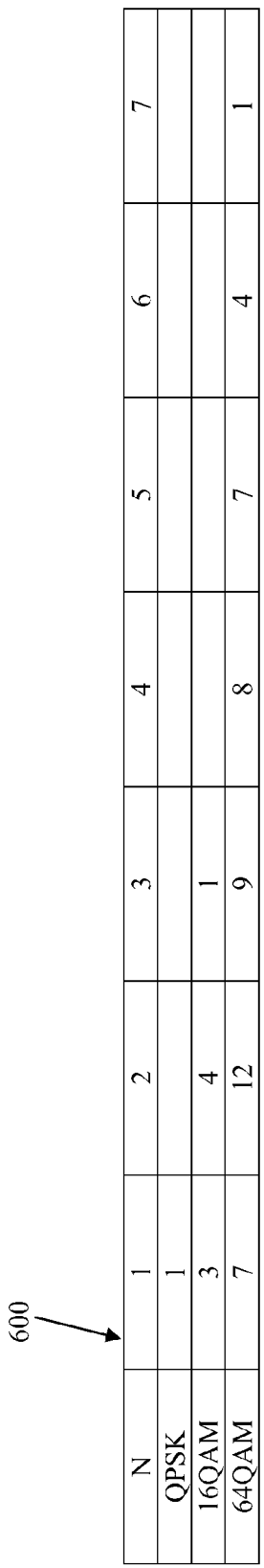
FIG. 6 is a table of the multiplicities of quadrature amplitude modulations.

FIG. 6 is a table 600 of the multiplicities $A_n$ of quadrature amplitude modulations including QPSK, 16QAM, and 64QAM. When SNR is high, $(d_{min}^{(i)})$ is dominant in determining $\gamma_{q,i}$. Accordingly, the average noise parameter for the $l^{th}$ block may be simplified as $$\tilde{\gamma}_l \approx \frac{A_1^{(i)}}{m_i 2^{m_i-1}} \exp\left(-\frac{(d_{min}^{(i)})^2}{4N_0}\right).$$

The throughput optimization for turbo coded adaptive IR hybrid ARQ is to find the optimal assignment rates $\{\lambda_l^*\}_{l=1}^L$ and the modulation set $\{m_l^*\}_{l=1}^L$ that maximize the throughput, which can be summarized as $$\max_{\{m_l\}_{l=1}^L, \{\gamma_l\}_{l=1}^L} \eta_{TC}$$

$$\text{s.t.} \sum_{l=1}^L \lambda_l \leq 1, \{m_l\} \in \{(1, 2, 3)^L\},$$

where the throughput is $$\eta_{TC} = \frac{(1-p(L))r_0}{\frac{\lambda}{2m}\left(1 + \sum_{l=1}^{L-1} p(l)\right)}$$

with the block error probability p(l) submitted with $P_{TC,AIR}(l)$ as described above. Though discussed herein as having three types of modulations available—QPSK, 16QAM, and 64QAM—other modulations may be used.

For non-adaptive IR and CC hybrid ARQ, $\lambda_1 = \lambda_2 = \ldots = \lambda_L = \lambda$ and modulations $m_1 = m_2 = \ldots = m_L = m$. Therefore, the throughput is $$\eta_{TC} = \frac{(1-p(L))r_0}{\frac{\lambda}{2m}\left(1 + \sum_{l=1}^{L-1} p(l)\right)}$$

with the error probabilities $$P_{TC,NAIR}(l) \approx Pr\left((1-l\lambda) + \frac{l\lambda}{m}\sum_{q=1}^m \gamma_q NAIR > \exp(-c_0^{|C|})\right)$$

and $$P_{TC,CC}(l) \approx Pr\left((1-\lambda) + \frac{\lambda}{m}\sum_{q=1}^m \gamma_q, CC > \exp(-c_0^{|C|})\right),$$

where $\gamma_{q,NAIR}$ follows $$\gamma_q = \int \sqrt{\frac{1}{2^{m-1}} \sum_{x \in S_0^q} p(y|x) \frac{1}{2^{m-1}} \sum_{x \in S_1^q} p(y|z)} dy, q = 1, \ldots, m.$$

Considering pre-demodulation combining, $$\lambda_q, CC \approx \frac{1}{2^{m-1}} \sum_{x \in S_0^q} \sum_{z \in S_1^q} \exp\left(-\frac{l^2 d^2(x,z)}{4N_0}\right).$$

Similar to the throughput optimization for Gaussian coded hybrid ARQ, the optimization may also be solved using a gradient search method as described above.

$$\max_{\{m_l\}_{l=1}^L, \{\gamma_l\}_{l=1}^L} \eta_{TC}$$

$$\text{s.t.} \sum_{l=1}^L \lambda_l \leq 1, \{m_l\} \in \{(1, 2, 3)^L\},$$

is a mixed-integer nonlinear optimization problem with both continuous and discrete variables. Given the average long-term receive power P and the maximum number of transmissions in the hybrid ARQ process L, the optimization includes the following two steps:

First, for any given sequence $\{m_l\}_{l=1}^L \in \{(1,2,3)^L\}$, the optimal assignment rates that maximize the throughput are found as $$\lambda'(m) = \arg\max_\lambda \eta_{TC}(\lambda_l, m, p)$$

$$\text{s.t.} \sum_l \lambda_l \leq 1, \text{ where } \lambda \triangleq [\lambda_1, \ldots, \lambda_L]^T, m \triangleq [m_1, \ldots, m_L]^T$$

and $p \triangleq [p_1, \ldots, p_L]^T$. Here, p is a function of $\lambda$ and m.

Second, find the optimum m* that maximizes $\eta^{TC}(m)$ by enumerating all $3^L$ candidate sequences $\{m_l\} \in \{(1,2,3)^L\}$. The optimal assignment rates are then $\lambda^* = \lambda'(m^*)$.

However, due to the constraint of $\{\lambda\}$ it is not straightforward to apply the gradient search method to solve the optimization in the first step above. FIG. 9 describes a genetic algorithm to obtain the optimal assignment rates for the given modulation set m according to an embodiment of the present invention.

Figure 7:
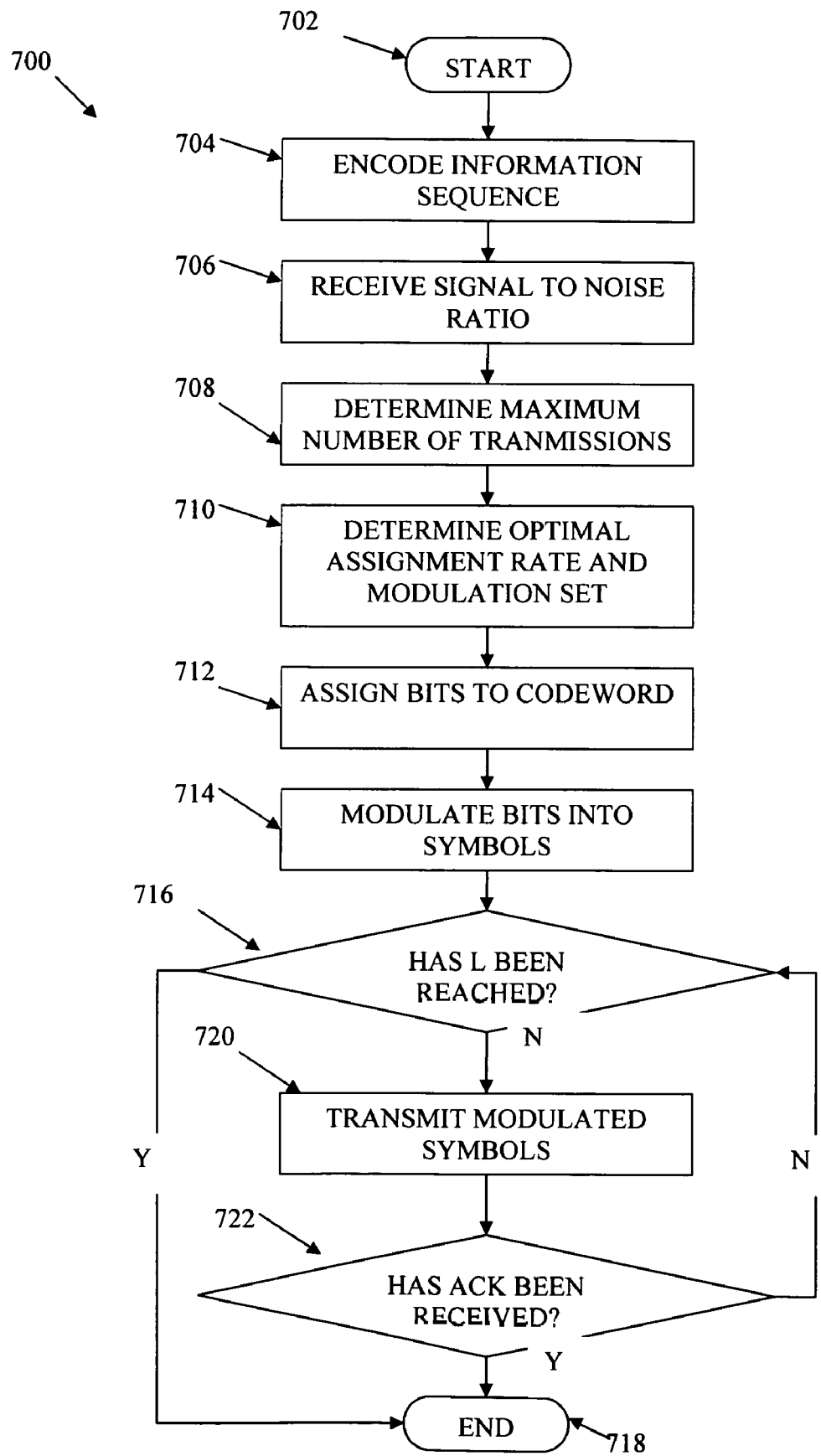
FIG. 7 is a flowchart of a method of transmission with adaptive IR hybrid ARQ according to an embodiment of the present invention.

FIG. 7 is a flowchart of a method 700 of transmission with adaptive IR hybrid ARQ according to an embodiment of the present invention. The transmission method 700 may be performed by wireless transmission system 100, especially controller 106. For example, transmitter 102 is adapted to perform the method 700 as described herein. The method starts at step 702.

In step 704, an information sequence is encoded. The information sequence may be encoded by transmitter 102, encoder 302, encoder 402, and/or encoder 502. A sequence b is encoded by a (n,k) channel code to form a length (n) codeword.

In step 706, a long-term signal to noise ratio is received. The SNR P may be received from receivers 104 or from another location. In an alternative embodiment, transmitter 102 determines the SNR P.

In step 708, a maximum number of transmissions is determined. The maximum number of transmissions L of an initial transmission, as described above with respect to FIG. 1, may be predetermined, input by a user, or determined in any other appropriate fashion.

In step 710, an optimal assignment rate and modulation set is determined. The hybrid ARQ process is configured by determining the optimal assignment rates $\{\lambda_l\}$ and modulation sets $\{M_l\text{-QAM}\}$ based on the SNR P and maximum number of transmission L determined in steps 706 and 708. Methods for determining optimal assignment rates and modulation sets are described above and below with respect to FIGS. 8 and 9.

In at least one embodiment, tables of optimized transmission rates for hybrid ARQ are stored (e.g., in a memory of transmitter 102 or processor 106, etc.). For practical QAM, the optimized rates $\{\lambda_l\}$ for the channel code and the optimized modulation sets $\{M_L\text{-QAM}\}$ are stored for multiple SNR P and maximum numbers of transmissions L.

In step 712, coded bits are assigned to a codeword. Based on the assignment rate $\{\lambda_l\}$ from step 710, coded bits are assigned to a length (n) codeword for subsequent retransmissions with the $l^{th}$ sequence containing $n\lambda_l$ bits in a hybrid ARQ process. The length (n) coded sequence is divided into L+1 sets with $n\lambda_l$ bits (e.g., the length) for l=1, . . . , L. The remaining coded bits are assigned to the $(L+1)^{th}$ sets.

In step 714, the bits are modulated into symbols. In at least one embodiment, $n\lambda_l$ bits are modulated into $M_l$-QAM symbols for l=1 to L.

In step 716, a determination is made as to whether the maximum number of transmissions has been reached. With the initialization l=1 for the first transmission, the current status of the number of transmissions, l, is determined. If l is greater than L, the method 700 proceeds to step 718 and the method ends. If l is less than or equal to L, the method 700 proceeds to step 720 and modulated symbols are transmitted.

The modulated symbols are the symbols modulated in step 714. The $$\frac{\lambda_l n}{\log_2 M_l} M_l - QAM$$

modulated symbols are transmitted (e.g., by transmitter 102).

In step 722, a determination is made as to whether an acknowledgement has been received. If an acknowledgement (ACK) of the transmission from step 720 has been received (e.g., from receiver 104 at transmitter 102), the method proceeds to step 718. That is, if an ACK is received indicating successful decoding of a transmitted message, the method 700 ends at step 718. If a negative acknowledgement (e.g., a NAK) is received or no reply is received, the method 700 returns control to step 716 and retransmission is attempted.

Figure 8:
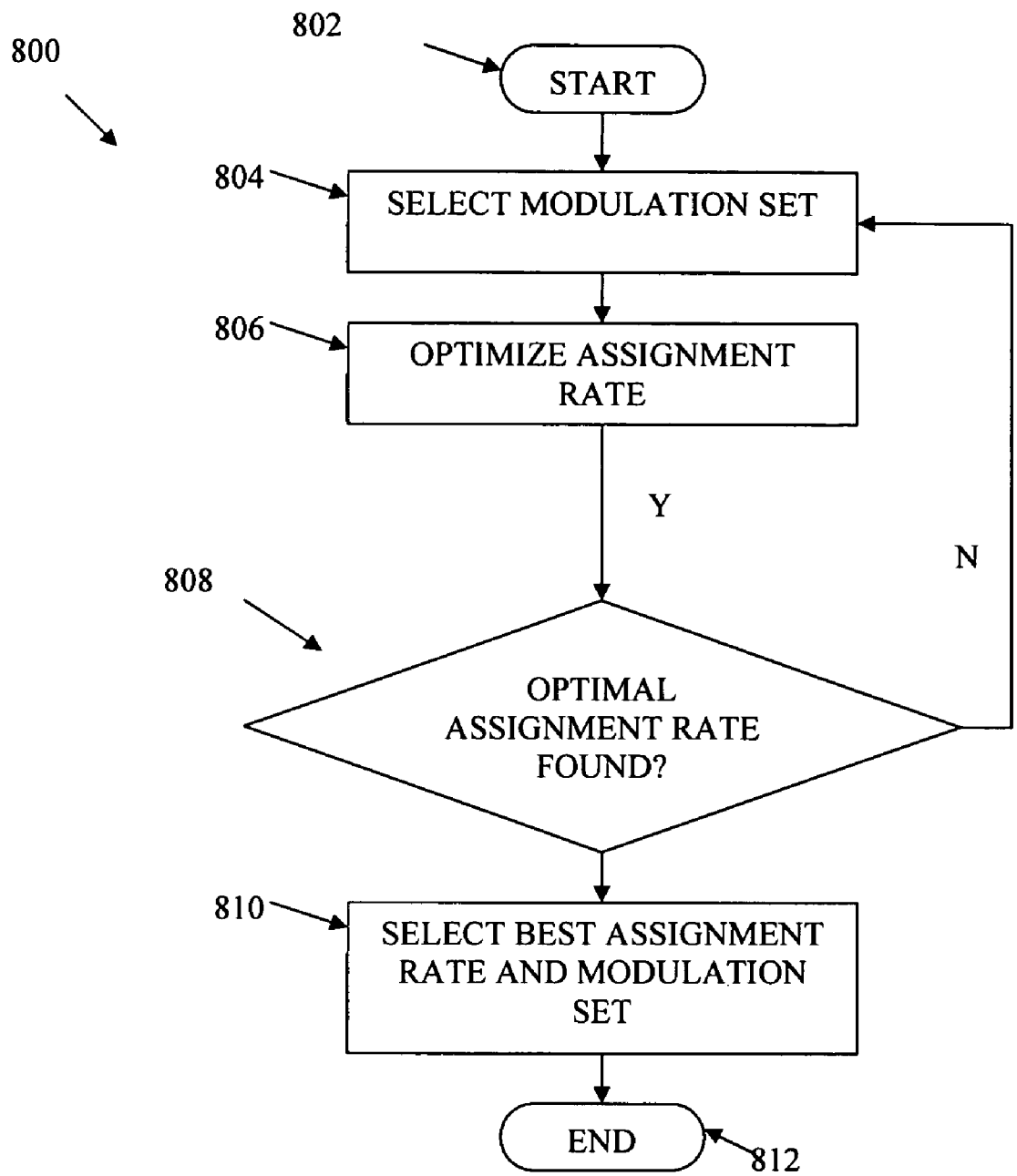
FIG. 8 is a flowchart of a method of optimizing throughput in adaptive IR ARQ systems according to an embodiment of the present invention.

FIG. 8 is a flowchart of a method 800 of optimizing throughput in adaptive IR ARQ systems according to an embodiment of the present invention. The method 800 may be performed by wireless transmission system 100, specifically transmitter 102, processor 106, and/or rate assigners 304, 404, and/or 504. Method 800 is a rate optimization for adaptive IR hybrid ARQ and may be used in the determination of the optimal rate assignment in step 710 of method 700 above. The method 800 begins at step 802.

In step 804, a modulation set is selected. The modulation set may be the modulation set $\{M_l\text{-QAM}\}$ from the set of $\{(QPSK, 16QAM, 64QAM)^L\}$ as described above.

In step 806, the assignment rate is maximized for the throughput for the modulation set selected in step 804. In at least one embodiment, the assignment rate is maximized using the method described below with respect to FIG. 9. Of course, other genetic methods (e.g., algorithms) or other algorithms may be used to determine an optimal assignment rate.

In step 808, a determination is made as to whether the optimal assignment rates have been obtained for all of the modulation set selected in step 804. If the optimal assignment rates have not been obtained for all of the modulation set selected in step 804, the method 800 returns control to step 804 and a modulation set is selected. If the optimal assignment rates have been obtained for all of the modulation set selected in step 804, the method proceeds to step 810 and the set of assignment rates and modulations that correspond to the maximal throughput is selected. That is, the best set of assignment rates and modulations is selected. The method ends at step 812.

Figure 9:
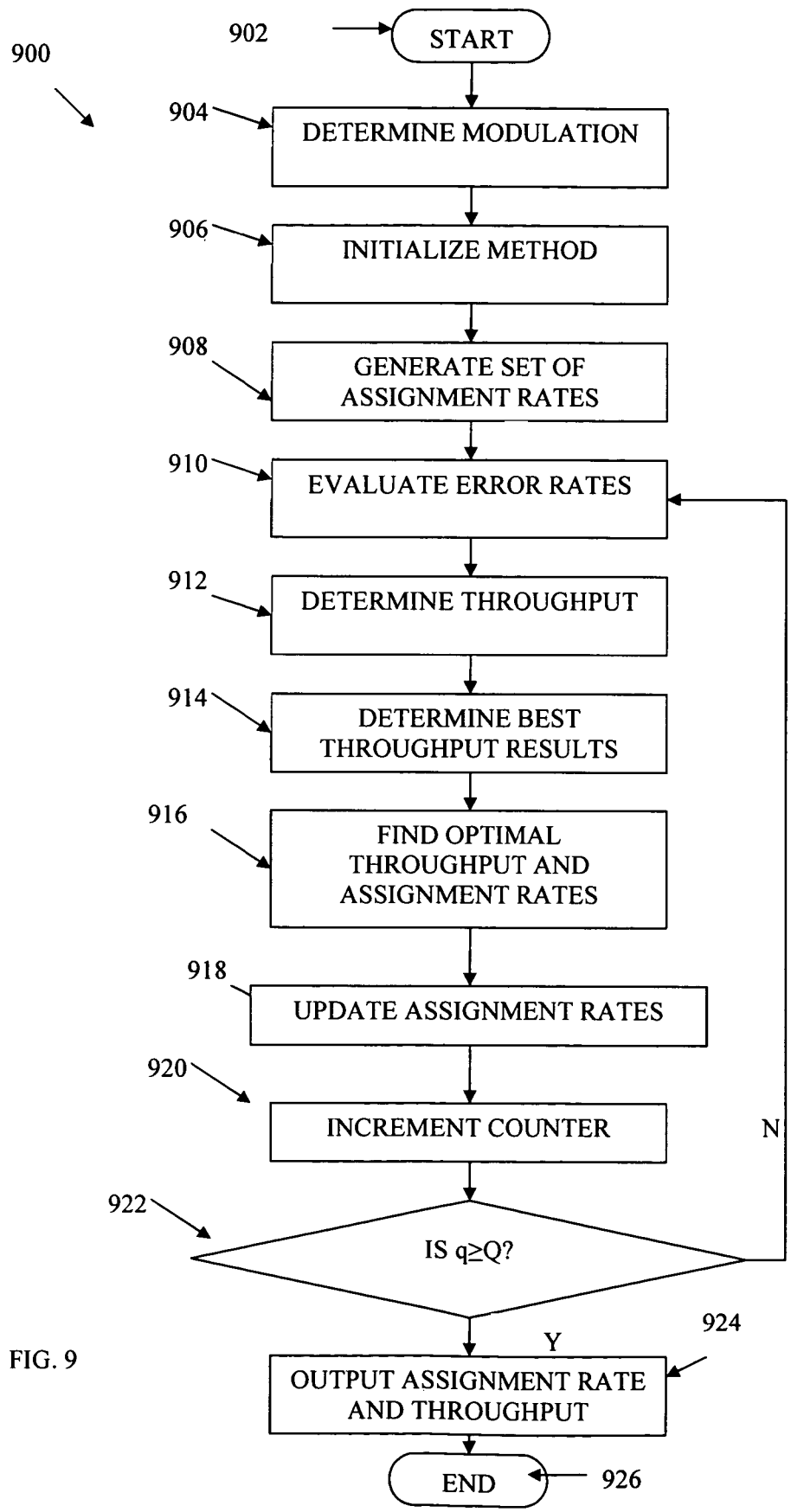
FIG. 9 is a flowchart of a method of maximizing throughput according to an embodiment of the present invention.

FIG. 9 is a flowchart of a method 900 of maximizing throughput according to an embodiment of the present invention. Method 900 may, in some embodiments, be used to optimize the assignment rate for the given modulation set to maximize throughput, as in step 806 of method 800. Method 900 is a genetic (e.g., iterative) algorithm to solve rate optimization for adaptive hybrid ARQ. The method 900 may be performed by wireless transmission system 100, specifically transmitter 102, processor 106, and/or rate assigners 304, 404, and/or 504. Method 900 begins at step 902.

In step 904, a modulation is determined. That is, given a modulation set (e.g., the modulation set selected in step 804 of method 800), $\{m_l\}$ is determined. In at least one embodiment, $$m_l = \frac{\log_2 M_l}{2}, l = 1, \ldots, L.$$

In step 906, the method 900 is initialized. The number of randomized candidates T, the maximal iteration number Q, and step size p are set.

In step 908, a set of assignment rates is generated. The T set of assignment rates is randomly generated as $\lambda_t^{(q=0)} = [\lambda_{t,1}^{(0)}]^T$, t=1, . . . , T, with $\Sigma_l \lambda_{t,1}^{(0)} \leq 1$.

In step 910, the error rates are evaluated. Beginning with q=0 and given the candidate assignment rate and the modulation set $\{\lambda_{t,1}^{(q)}, m_l\}$, the error rates are evaluated by $$Pr(\bar{y}_{H,l} > \exp(-c_0^{|C|})) = Pr\left(\left(1 - \sum_{i=1}^{l} \lambda_i\right) + \sum_{i=1}^{l} \frac{\lambda_i}{m_i} \sum_{q=1}^{m_i} \gamma_{q,i} > \exp(-c_0^{|C|})\right)$$

as described above.

In step 912, the throughput is determined. The throughput may be computed as $$\eta_{TC} = \frac{(1 - p(L))r_0}{\frac{\lambda_1}{2m_1}\left(1 + \sum_{l=1}^{L-1} \frac{\lambda_{l+1}}{2m_{l+1}} p(l)\right)},$$

as described above.

In step 914, the best throughput results are determined. The throughput results at the current $(q^{th})$ iteration are compared with the results at the previous $((q-1)^{th})$ iteration. If the throughput is higher in the current iteration than in the previous iteration, the current results are kept. Otherwise, the current throughput and assignment rates are replaced with the previous throughput and assignment rates. That is, if $\eta_t^{(q)} < \eta_t^{(q-1)}$, then $\eta_t^{(q)} \leftarrow \eta_t^{(q-1)}$ and $\lambda_t^{(q)} \leftarrow \lambda_t^{(q-1)}$.

In step 916, the optimal throughput and corresponding assignment rates are found. The optimal throughput and corresponding assignment rates are found among T candidates such that $\lambda^{*(q)} = \arg\max \eta_t^{(q)}$.

In step 918, the assignment rates are updated. The assignment rates $\lambda_t^{(q-1)}$ are updated with $\Sigma_l \lambda_t^{(q-1)} \geq 1$ according to $\Delta\lambda_{t,l} = \mu(\lambda_{t_1,l}^{(q)} - \lambda_{t_2,l}^{(q)} + \lambda_{t_3,l}^{(q)} - \lambda_{t_4,l}^{(q)})$ and $\lambda_{t,l}^{(q+1)} = \max\{\lambda_l^{*(q)} + \Delta\lambda_{t,l}, 0\}$, $l=1, \ldots, L$, $t=1, \ldots, T$ where $t_1$-$t_4$ are integers randomly chosen from $\{1, \ldots, T\}$. In this way, the optimal assignment rates are randomized and the descendent assignment rates are formed for the $(q+1)^{th}$ iteration.

In step 920, a counter is incremented so that q=q+1. In step 922, a check is performed to determine if the maximum iteration size has been reached. If the maximum number of iterations has not been reached (e.g., q<Q), the method returns control to step 910, the iteration number is incremented by one, and the error rates are evaluated.

If the maximum number of iterations has been reached (e.g., q≧Q), the method 900 proceeds to step 924 and the optimal assignment rate and throughput are outputted. The optimal assignment rate $\lambda^{*(Q)}$ and throughput result for a given modulation set $\{M_l\}$ (e.g., the modulation set selected in step 804 of method 800 above) is output (e.g., to transmitter 102, processor 106) and may be stored, such as in a table or other look-up.

One of skill in the art will recognize that, though described above with respect to QAM modulations QPSK, 16QAM, and 64QAM, other modulations could be used. Similarly, method 900 is described above for turbo codes as the binary channel code, but other suitable codes may be used, such as convolutional codes, low-density parity check (LDPC) codes, and any other modulation settings.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of packet transmission in a wireless adaptive hybrid automatic repeat request transmission system with incremental redundancy comprising:
    determining an assignment rate and modulation set $\{(\lambda_l, M_l)\ l=1, \ldots, L\}$ for a packet based at least in part on a maximal number of L transmission attempts and a long term signal to noise ration of the wireless transmission system which maximize the average throughput of the hybrid automatic repeat request transmission system given by $$\eta_{TC} = \frac{(1-p(L))r_0}{\frac{\lambda_1}{2m_1}\left(1 + \sum_{l=1}^{L-1} \frac{\lambda_{l+1}}{2m_{l+1}} p(l)\right)},$$

where $\lambda_l$, $$\sum_{l=1}^{L} \lambda_l \leq 1,$$

and $M_l$ denote the assignment rate and the $M_l$-QAM modulation for the lth transmission block in a hybrid ARQ transmission of a packet, respectively, $2m_l$ is the number of bits in the $M_l$-QAM modulation where $$m_l = \frac{\log_2 M_l}{2},$$

l=1, . . . , L and p(l), denotes the packet error probability after l transmissions; and
    transmitting information related to the packet based at least in part on the determined assignment rate and a determined quadrature amplitude modulation $(\lambda_l, M_l)$, l=1, . . . , L for the lth transmission of a maximal number of L transmission attempts for a packet in a hybrid ARQ transmission process.

2. The method of claim 1 further comprising:
    determining the maximal number of transmission attempts; and
    determining the long term signal to noise ration of the wireless transmission system.

3. The method of claim 1 further comprising:
    assigning coded bits to a codeword based on the determined optimized assignment rate;
    modulating the codeword using quadrature amplitude modulation into a block of quadrature amplitude modulation symbols; and
    wherein transmitting information related to the packet comprises transmitting the block of quadrature amplitude modulation symbols.

4. The method of claim 1 wherein determining an optimized said assignment rate for the modulation set using a genetic process further comprises:
    determining a modulation candidate from the modulation set;
    determining a number of randomized candidates, a maximal iteration number, and a step size; and
    determining an optimized said assignment rate and throughput for the modulation set using the genetic process.

5. The method of claim 4 wherein determining an optimized assignment rate and throughput for the modulation set using the genetic process comprises repeating the steps of:
    (a) generating a determined number of sets of candidate assignment rates randomly;
    (b) determining the error rates of every set of candidate assignment rates p(l);
    (c) determining the throughput of the candidate assignment rates $$\eta_{TC} = \frac{(1-p(L))r_0}{\frac{\lambda_1}{2m_1} + \sum_{l=1}^{L-1} \frac{\lambda_{l+1}}{2m_{l+1}} p(l)};$$

(d) determining an optimal said assignment rate and throughput;

(e) determining if the maximal iteration number has been reached; and if the maximal iteration number has not been reached, performing steps b through e.

6. The method of claim 5 further comprising:

outputting the determined optimized said assignment rate; and outputting the determined throughput.

7. A non-transitory machine readable medium having program instructions stored thereon, the instructions capable of execution by a processor and defining the steps of:

determining an assignment rate and modulation set $\{(\lambda_l, M_l), l=1, \ldots, L\}$ for a packet based at least in part on a maximal number of L transmission attempts and a long term signal to noise ration of the wireless transmission system which maximize the average throughput of the hybrid automatic repeat request transmission system given by $$\eta_{TC} = \frac{(1-p(L))r_0}{\frac{\lambda_1}{2m_1}\left(1 + \sum_{l=1}^{L-1} \frac{\lambda_{l+1}}{2m_{l+1}} p(l)\right)},$$

where $\lambda_l$, $$\sum_{l=1}^{L} \lambda_l \leq 1,$$

and $M_l$ denote the assignment rate and the $M_l$-QAM modulation, for the lth transmission block in a hybrid ARQ transmission of a packet respectively, $2m_l$ is the number of bits in the $M_l$-QAM modulation where $$m_l = \frac{\log_2 M_l}{2},$$

$l=1, \ldots, L$ and $p(l)$, denotes the packet error probability after l transmissions; and transmitting information related to the packet based at least in part on the determined assignment rate and a determined quadrature amplitude modulation $(\lambda_l, M_l)$, $l=1, \ldots, L$ for the lth transmission of a maximal number of L transmission attempts for a packet in a hybrid ARQ transmission process.

8. The machine readable medium of claim 7 wherein the instructions further define the steps of:

determining the maximal number of transmission attempts; and determining the long term signal to noise ration of the wireless transmission system.

9. The machine readable medium of claim 7 wherein the instructions further define the steps of:

assigning coded bits to a codeword based on the determined optimized assignment rate;

modulating the codeword using quadrature amplitude modulation into a block of quadrature amplitude modulation symbols; and wherein transmitting information related to the packet comprises transmitting the block of quadrature amplitude modulation symbols.

10. The machine readable medium of claim 7 wherein the instructions further define the steps of:

determining a modulation set;

determining an optimized said assignment rate for the modulation set using a genetic process; and determining if the determined optimized said assignment rate for the modulation set maximizes throughput for the modulation set.

11. The machine readable medium of claim 10 wherein the instructions for determining an optimized said assignment rate for the modulation set using a genetic process further define the steps of:

determining a modulation candidate from the modulation set;

determining a number of randomized candidates, a maximal iteration number, and a step size; and determining an optimized said assignment rate and throughput for the modulation set using the genetic process.

12. The machine readable medium of claim 11 wherein the instructions for determining an optimal said assignment rate and throughput for the modulation set using the genetic process further define repeating the steps of:

(a) generating a determined number of sets of candidate assignment rates randomly;

(b) determining the error rates of every set of candidate assignment rates p(l);

(c) determining the throughput of the candidate assignment rates $$\eta_{TC} = \frac{(1-p(L))r_0}{\frac{\lambda_1}{2m_1} + \sum_{l=1}^{L-1} \frac{\lambda_{l+1}}{2m_{l+1}} p(l)};$$

(d) determining the optimized said assignment rate and throughput;

(e) determining if the maximal iteration number has been reached; and if the maximal iteration number has not been reached, performing steps b through e.

\* \* \* \* \*